(12) United States Patent
Hofhaus

(10) Patent No.: US 9,902,234 B2
(45) Date of Patent: Feb. 27, 2018

(54) VEHICLE AIR CONDITIONING SYSTEM HAVING A FILTER ELEMENT WITH A MOISTURE SENSOR AND A METHOD FOR OPERATING A VEHICLE AIR CONDITIONING SYSTEM

(75) Inventor: Joern Hofhaus, Freising (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 1211 days.

(21) Appl. No.: 12/940,406

(22) Filed: Nov. 5, 2010

(65) Prior Publication Data
US 2011/0048040 A1    Mar. 3, 2011

Related U.S. Application Data

(63) Continuation of application No. PCT/EP2009/002291, filed on Mar. 28, 2009.

(30) Foreign Application Priority Data

May 8, 2008  (DE) ................. 10 2008 022 630

(51) Int. Cl.
*B60H 1/00* (2006.01)
*B01D 46/00* (2006.01)
*B60H 3/06* (2006.01)

(52) U.S. Cl.
CPC ....... *B60H 1/00785* (2013.01); *B01D 46/009* (2013.01); *B60H 1/00849* (2013.01); *B60H 3/06* (2013.01); *B60H 2003/0683* (2013.01)

(58) Field of Classification Search
CPC ...... B60H 1/008; B60H 1/00785; B60H 3/06; B60H 3/0608

USPC ....... 62/150, 176.1, 176.6, 186, 317, 56, 93; 236/44 A, 44 C, 49.3; 454/75, 156; 96/19

See application file for complete search history.

(56) References Cited

U.S. PATENT DOCUMENTS

| 4,752,855 | A | * | 6/1988 | Fedter et al. | ................. 361/286 |
| 4,917,293 | A |   | 4/1990 | Fedter et al. | |
| 4,978,907 | A | * | 12/1990 | Smith | ........................ 324/72.5 |
| 5,674,381 | A | * | 10/1997 | Den Dekker | ................... 210/85 |
| 5,775,580 | A | * | 7/1998 | Sizemore et al. | .......... 236/44 E |

(Continued)

FOREIGN PATENT DOCUMENTS

| DE | 26 19 600 A1 | 11/1977 |
| DE | 35 17 481 A1 | 11/1986 |

(Continued)

OTHER PUBLICATIONS

Dubbel, Taschenbuch fuer den Maschinenbau [Handbook for Mechanical Engineering], 20th ed., Springer Verlag, 2001, W4, W6, W8, W10, W11, ISBN 3-540-67777-1.

(Continued)

*Primary Examiner* — Jianying Atkisson
*Assistant Examiner* — Antonio R Febles
(74) *Attorney, Agent, or Firm* — Crowell & Moring LLP

(57) ABSTRACT

A vehicle air conditioning system has an air filter, a moisture sensor, which is mounted on and/or at the air filter, and an electronic device, which is provided for controlling and/or regulating the air conditioning system of the vehicle. The electronic device is fed a signal, delivered by the moisture sensor. The moisture sensor is arranged upstream with respect to the air filter.

15 Claims, 4 Drawing Sheets

(56) References Cited

U.S. PATENT DOCUMENTS

| | | | |
|---|---|---|---|
| 5,793,645 | A | 8/1998 | Rump et al. |
| 5,801,307 | A * | 9/1998 | Netzer ................. 73/170.17 |
| 6,052,998 | A | 4/2000 | Dage et al. |
| 6,564,768 | B2 * | 5/2003 | Bauer et al. ............ 123/198 E |
| 6,711,524 | B2 * | 3/2004 | Wolf et al. ................ 702/182 |
| 6,834,509 | B2 * | 12/2004 | Palfy et al. ................. 62/140 |
| 6,840,051 | B1 | 1/2005 | Stein |
| 6,894,620 | B2 | 5/2005 | Reinhardt et al. |
| 7,014,357 | B2 * | 3/2006 | Severson ................... 374/16 |
| 7,077,004 | B2 * | 7/2006 | Mitter .................. 73/335.04 |
| 2002/0078916 | A1 * | 6/2002 | Altmann et al. ......... 123/184.21 |
| 2003/0076119 | A1 | 4/2003 | Horz et al. |
| 2004/0026522 | A1 * | 2/2004 | Keen et al. ............... 236/49.3 |
| 2004/0194546 | A1 * | 10/2004 | Kanehori ............... 73/335.04 |
| 2006/0086495 | A1 * | 4/2006 | Yelles ..................... 165/271 |
| 2006/0154327 | A1 * | 7/2006 | Bachur et al. ............... 435/34 |
| 2006/0192570 | A1 | 8/2006 | Dworatzek et al. |
| 2007/0151263 | A1 | 7/2007 | Niemann et al. |
| 2009/0211455 | A1 | 8/2009 | Guenther et al. |
| 2010/0212332 | A1 | 8/2010 | Hofhaus et al. |

FOREIGN PATENT DOCUMENTS

| | | |
|---|---|---|
| DE | 36 24 171 A1 | 1/1988 |
| DE | 40 00 164 A1 | 7/1991 |
| DE | 101 40 510 B4 | 2/2004 |
| DE | 102 45 911 A1 | 4/2004 |
| DE | 10 2005 016 393 A1 | 5/2006 |
| DE | 10 2005 042 406 A1 | 3/2007 |
| DE | 10 2007 056 356 A1 | 5/2009 |
| EP | 1 246 679 B1 | 12/2005 |
| EP | 1 806 249 A1 | 7/2007 |
| JP | 7-257168 A | 10/1995 |
| WO | WO 00/32298 A1 | 6/2000 |
| WO | WO 01/62529 A1 | 8/2001 |
| WO | WO 2007/004559 A1 | 1/2007 |
| WO | WO 2007/028461 A1 | 3/2007 |

OTHER PUBLICATIONS

Knittel, O et al.: "Feuchtesensor Fuer Klimaautomaten", ATZ Automobiltechnische Zeitschrift, Vieweg Publishing, Wiesbaden, DE, vol. 102, Jan. 1, 2000 (Jan. 1, 2000), pp. 46-48, XP001158935, ISSN: 0001-2785, paragraph [0004].

International Search Report dated Oct. 16, 2009 with English translation (ten (10) pages).

German Office Action dated Mar. 26, 2009 with English translation (eight (8) pages).

Notification of First Chinese Office Action dated Jun. 1, 2012. (Two (2) pages).

Notification of Second Chinese Office Action and Search Report dated Feb. 16, 2013. (Seven (7) pages).

Notification of the Third Chinese Office Action dated Jul. 15, 2013 (Six (6) pages).

* cited by examiner

VEHICLE AIR CONDITIONING SYSTEM HAVING A FILTER ELEMENT WITH A MOISTURE SENSOR AND A METHOD FOR OPERATING A VEHICLE AIR CONDITIONING SYSTEM

CROSS-REFERENCE TO RELATED APPLICATIONS

This application is a continuation of PCT International Application No. PCT/EP2009/002291, filed Mar. 28, 2009, which claims priority under 35 U.S.C. § 119 from German Patent Application No. DE 10 2008 022 630.0, filed May 8, 2008, the entire disclosures of which are herein expressly incorporated by reference.

This application contains subject matter related to U.S. application Ser. No. 12/706,573, entitled "Air Filter for a Vehicle Air Conditioning System, Vehicle Air Conditioning System Comprising an Air Filter with a Moisture Sensor and a Method for Operating a Vehicle Air Conditioning System," filed on Feb. 16, 2010.

BACKGROUND AND SUMMARY OF THE INVENTION

The invention relates to a vehicle air conditioning system, and a method for operating a vehicle air conditioning system.

A vehicle air conditioning system of this type is known from DE 10 2005 042 406 A1. Furthermore, the relevant background art includes DE 36 24 171 A1, U.S. Pat. No. 6,840,051 B1, DE 40 00 164 A1, WO 2000 032298 A1, EP 18 06 249 A1 and U.S. Pat. No. 6,052,998 A.

Furthermore, German patent application DE 10 2007 056 356.8 (not published earlier) describes a method for controlling a vehicle air conditioning system in which a measure for the amount of intake water at the fresh air intake port of the air conditioning system of a vehicle is determined as a function of a sensor signal. For example, the signal of a rain sensor, mounted in the mirror area of the windshield, is used as the sensor signal. It is self-evident that the rain sensor measures the amount of water that is in the sensor area of the windshield, but not exactly the amount of water and/or moisture that is present in the intake area of the air conditioning system. The air conditioning system is controlled as a function of the amount of water determined by the rain sensor such that the amount of intake air flowing through the fresh air intake port is reduced.

EP 1 246 679 B1 describes an air filter element on which is mounted a chip with an integrated moisture sensor.

DE 35 17 481 describes a method for maintaining the effectiveness of chemisorption compositions of filters for motor vehicle cabs. In this case a filter element is used, on which a moisture sensor is mounted. A heating device is switched on or off as a function of the signal delivered by the moisture sensor.

WO 2007/028461 A1 discloses a filter arrangement in which a moisture sensor is mounted on a receptacle of the filter element. The moisture sensor measures the air humidity of the fluid flowing through the filter element.

DE 102 45 911 A1 describes an optical sensor arrangement by which the moisture loading of a filter element can be measured.

DE 101 40 510 B4 describes a filter arrangement including a sensor, which is mounted on the filter, and by which the air velocity of the air, flowing through the filter, and, thus, indirectly the loading of the filter element, can be measured.

In most vehicles the fresh air intake of the heating and cooling system occurs almost exclusively by way of a gap between the engine hood and the windshield. In the event of heavy rain or while driving through a carwash, a considerable amount of water can penetrate into the area in which the air conditioning system of the vehicle takes in its fresh air. Suitable technical measures are to be employed for the purpose of preventing the penetrating water from flowing through the air conditioning system and into the passenger compartment.

The object of the invention is to provide a vehicle air conditioning system that can be controlled and/or regulated as precisely as possible as a function of the moisture contained in the intake air and/or in the intake system of the air conditioning system of the vehicle.

This and other objects are achieved by a vehicle air conditioning system and method of operating same having an air filter, a moisture sensor, which is mounted on and/or at the air filter, and an electronic device, which is provided for controlling and/or regulating the air conditioning system of the vehicle. The electronic device is fed a signal, delivered by the moisture sensor. The moisture sensor is arranged upstream with respect to the air filter. Advantageous embodiments and further developments of the invention are described and claimed herein.

The starting point of the invention can be, for example, the aforementioned older German patent application DE 10 2007 056 356.8 (not published earlier), which has already been cited above. In this case, the amount of (fresh) intake air from the air conditioning system is regulated as a function of a sensor signal, which correlates quite well at least to some extent with the moisture loading of the intake air from the air conditioning system. The entire disclosure of DE 10 2007 056 356.8 is hereby expressly incorporated by reference herein.

One aspect of the invention consists of an air conditioning system of a vehicle with an electronic device for controlling and/or regulating the air conditioning system of the vehicle and a moisture sensor. In contrast to DE 10 2007 056 356.8, the moisture sensor is disposed on and/or at the air filter, preferably directly on and/or at an air filter. Mounting the moisture sensor on the filter is advantageous, because an additional holder for the sensor can be dispensed with, and the sensor can be positioned in an advantageous manner in the middle of the air stream. Relatively low flow rates prevail directly at the filter owing to the large surface, so that undesired sound effects are largely eliminated by the sensor that is positioned in the air stream.

The air filter is installed in an advantageous manner in an air duct of the air conditioning system of the vehicle. The moisture loading of the air flowing through the filter and/or the moisture loading of the air filter can be measured directly by use of the moisture sensor. In contrast to the sensors known from the prior art, the sensor is used for detecting the intake water in liquid form.

Preferably, the moisture sensor is arranged upstream with respect to the air filter. "Upstream" means on the "pressure side" of the air filter, that is, on that side of the air filter, against which the air from the air blower flows. An arrangement of a moisture sensor "downstream," as is mentioned, for example, in DE 10 2005 042 406 A1, is regarded to be more disadvantageous, because the air filter retains at least to some extent the water which is contained in the air stream in the liquid state. In contrast, an upstream arrangement of the moisture sensor has the advantage that water droplets, which are eventually drawn in, will be drawn in first through the blower and atomized as a consequence of the high shear forces and turbulence prevailing in the blower.

The result is that the air coming from the blower becomes suddenly wetter not only locally, but also over almost the whole flow width of the air duct and, thus, the air filter.

If the moisture loading exceeds a value, which is regarded as critical, then the electronic device can control and/or regulate one or more functional parameter(s) of the air conditioning system of the vehicle in such a manner that the moisture, which is fed into the passenger compartment by the air conditioning system by way of the air conveyed into the passenger compartment, is limited and/or reduced. Thus, for example, the amount of fresh intake air can be controlled and/or regulated as a function of the signal delivered by the moisture sensor. If the moisture sensor measures a high moisture value, then it can be provided that the volumetric flow of fresh intake air is reduced.

The dew point of the intake air can be determined by use of the moisture signal, delivered by the moisture sensor, using the electronic device. The air conditioning system of the vehicle can be regulated and/or controlled by the electronic device as a function of the determined dew point in such a way that a fogging of the windshield of the passenger compartment is avoided. Thus, the "fogging sensor," which is provided in conventional vehicle air conditioning systems for this purpose, could be eliminated.

A major advantage of the invention may also be seen in the fact that with comparatively simple and cost effective "design features," "an inrush of water" into the air duct system of the air conditioning system of the vehicle can be detected very reliably and fast. Another advantage of the invention may be seen in the fact that with these very simple design measures a low flow resistance can be achieved. Thus, when the blower output is specified, it is possible to achieve a higher volumetric air flow and, thus, better efficiency.

Preferably, the volumetric flow of fresh intake air is reduced precisely when the moisture at the moisture sensor exceeds a preset limit value, for example, when extremely large amounts of moisture and/or water are sensed, for example, during a sudden downpour or while driving through a carwash. The limit value does not have to be necessarily a fixed predetermined value. Rather, the limit value can be determined by the electronic device from a limit value function and/or from a characteristic map, which in turn can depend on a plurality of parameters, such as the outside temperature, the vehicle speed, etc.

The moisture sensor may be a sensor which measures directly the water loading of the air flowing through the filter, and/or the water loading of the filter. The sensor may also be, for example, an electric sensor whose electric resistance and/or whose conductivity change (changes) as a function of the (air) humidity.

However, the moisture sensor can be preferably a capacitive sensor, which is based on the fact that the capacitance changes as a function of the moisture present at the sensor. The "core" of such a sensor can be a "capacitor" with a dielectric that can be formed by a ceramic element, for example, in the form of a chip, which changes the capacitance of the capacitor as a function of the moisture loading. The ceramic element can be heated by a heating device, for example, an electric heater. Such a heating device can dry in a targeted manner the moisture sensor, a feature that has the advantage that, after the moisture has been dragged in, the moisture sensor can be restored relatively quickly again into a ready-to-use state.

In principle, however, other kinds of sensors, for example, optical sensors, are also suitable.

According to a further development of the invention, the filter element is "coded." In this context the term "coded" means that the type of incorporated air filter can be recognized by the electronic device, so that the electronic device can recognize, for example, whether it is a particle filter that has been incorporated, a combination filter, a fine dust filter, or any other type of filter.

The type of filter can be "detected" by the electronic device in a variety of ways. For example, the filter type can be determined by the electronic device using an optoelectronic method. It is contemplated, for example, that an optical sensor scans a barcode, provided on the air filter, or the geometry and/or specific subareas of the geometry of the filter element.

As an alternative to the aforesaid, the line resistance and/or the conductance of the moisture sensor, disposed on and/or at the air filter, could be measured, and in this way the filter type could be detected. Thus, for example, it could be provided that a particle filter is equipped with a moisture sensor, which exhibits a line resistance in a range of x ohms (for example, 100 ohms), a combination filter is equipped with a moisture sensor, which exhibits a line resistance in a range of y ohms (for example, 200 ohms), and a fine dust filter is equipped with a moisture sensor, which exhibits a line resistance in a range of z ohms (for example, 300 ohms).

If one assumes that, as a result of the moisture fluctuation, the resistance of the moisture sensor can vary over a bandwidth of, for example, 50 ohms, then the electronic device can recognize the filter type by the magnitude of the resistance of the "moisture sensor electric circuit."

An "inrush of water" into the air conditioning system will become apparent in a comparatively significant and sudden change in the signal, delivered by the moisture sensor. In order to be able to distinguish between the normal fluctuation in the air humidity and the inrush of water, it can be provided that, in addition to the absolute value of the signal delivered by the moisture sensor, the signal gradient is monitored by the electronic device, that is, how intense the rise and/or fall of the signal over time is.

According to a further development of the invention, the air duct system has a "blower," for example, a fan wheel, which is integrated into the air duct system and/or is disposed therein. The air filter can be arranged "upstream" (that is, in the flow direction of the air, in front of the blower) or downstream (that is, in the flow direction of the air, following the blower). If the air filter is arranged downstream, then the water droplets, penetrating into the air duct system, are atomized into ultrafine water droplets by the blower, a feature that has the advantage that the moisture sensor can register the penetration of moisture into the air duct system with hardly any delay. If the air filter were to be arranged upstream of the blower, then a penetrating water droplet would have to strike first the moisture sensor, a feature that can be associated with a certain "dead time" until the registration of the inrush of water.

An especially simple and cost effective option for making a moisture sensor is to arrange a metal wire or a flat metal strip, for example, on a frame of the filter element. As an alternative, a metal wire could also be integrated into the frame of the filter element or directly into the filter material. The material, from which the wire and/or the strip is made, can be, for example, copper or an alloy of various metals. The electric conductor, forming the moisture sensor, can be connected to the electrical system and/or the electronic device of the vehicle by use of, for example, electric contacts or by use of a plug.

In summary the invention achieves, among other things, the following advantages:

(1) By means of the moisture sensor, which is mounted directly on and/or at the air filter, the moisture, contained in the intake air, and/or the water, contained in the intake air, can be detected directly and, thus, very reliably.

(2) Since the moisture sensor can be mounted directly on and/or at the air filter, there is no need for a separate holder and/or fastener for the moisture sensor.

(3) The filter type can be coded by way of the electric circuit of the moisture sensor and, thus, can be recognized by the electronic device. As a function of the detected filter type, an operating map, stored in the electronic device, and/or a corresponding operating strategy can be selected.

(4) As a function of the detected filter type, servicing intervals can be set automatically correctly.

(5) Thus, the electronic device can also recognize whether a filter has been installed at all and/or whether eventually a filter was installed that does not have a moisture sensor that the electronic device "knows" and, thus, may cause problems in the air conditioning system of the vehicle. The installation of a filter, and the installation of the filter that is provided by the manufacturer for the air conditioning system of the vehicle, is important, because only a really suitable filter can reliably protect the evaporator of the air conditioning system from dirt, fibers, particles or copper dust from the collectors of the blower motor from being dragged into the system. Only a "fitting" filter can effectively prevent and/or at least slow down the growth and/or accumulation of bacteria and/or fungi on the evaporator and, thus, the build up of odor. In addition, the evaporator is better protected against extraneous particles being dragged in and, thus, also protected against the associated risk of corrosion. However, the installation of an air filter, intended by the automaker, offers not only an advantage for the customer, but also for the automaker, because it is in the best interest of both sides to avoid as much as possible repair and warranty costs.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
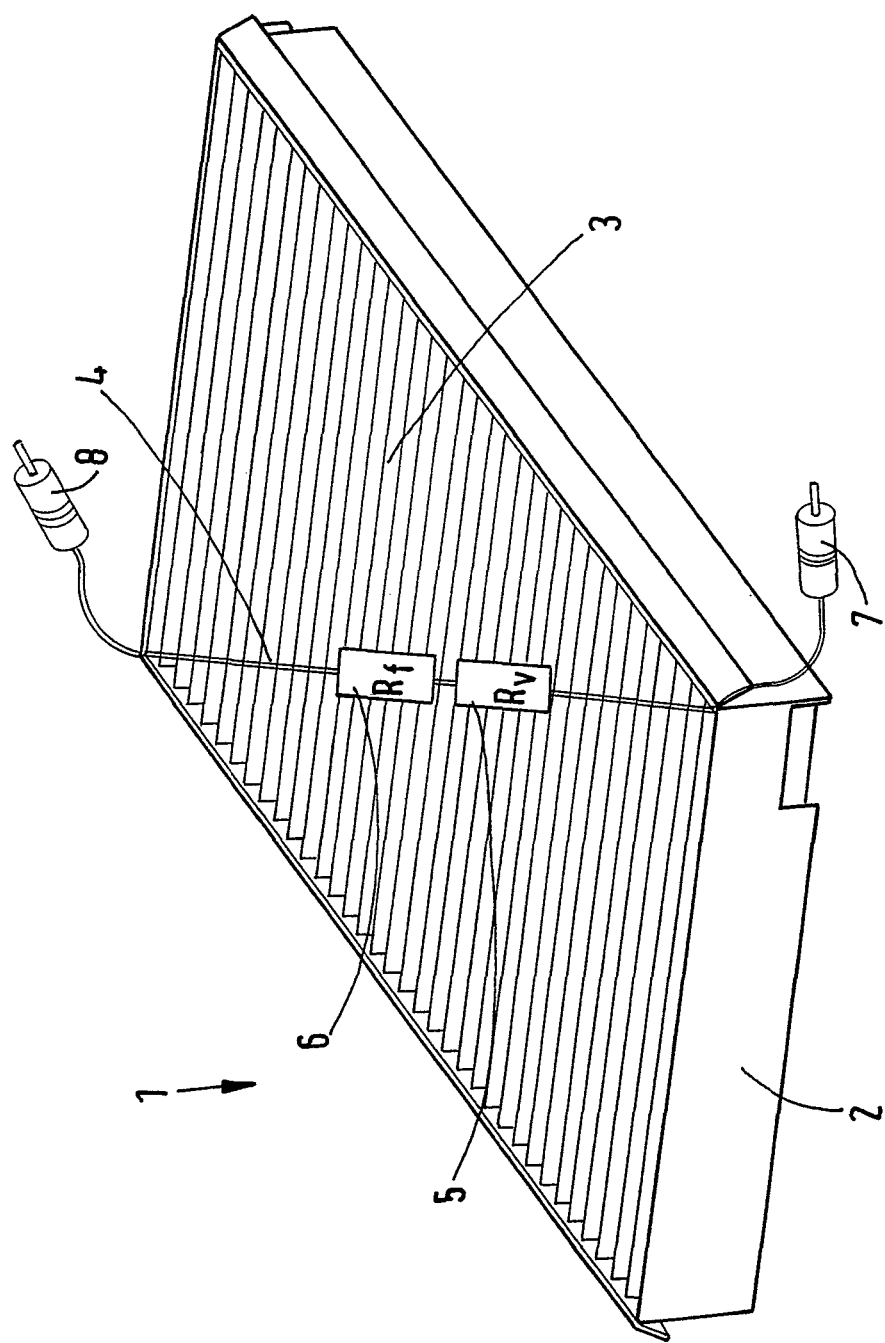
FIG. 1 depicts a first embodiment of an air filter of an air conditioning system of a vehicle according to the invention.

FIG. 1 shows an air filter 1, which can be inserted into an air duct, in particular into a fresh air intake duct of a vehicle air conditioning system, which is not shown in detail herein. In the embodiment illustrated herein, the air filter 1 has an essentially rectangular filter frame 2 that is made of a synthetic plastic material, and a filter fabric 3, which is folded in zig-zag folds.

In the embodiment that is illustrated herein, a "diagnostic cable" 4 extends diagonally across the filter frame 2, that is, from one corner of the filter frame to a diagonally opposite corner of the filter frame 2. Furthermore, a series resistor 5 and a moisture dependent resistor 6 are integrated into the diagnostic cable. The series resistor 5 defines a "resistance offset," that is, the order of magnitude, in which the total resistance of the diagnostic cable 4 lies. Hence, with the aid of the size of the series resistor 5 or with the aid of the size of the total resistance of the "diagnostic electric circuit," which is determined basically by the series resistor 5, the electronic device can detect the current type of filter, a feature that is explained in even more detail in conjunction with FIG. 4. In the case of the series connection of the two resistors 5, 6, shown in FIG. 1, the total resistance is the product of the sum of both resistances. Thus, the total resistance depends on the moisture loading at the resistor 6.

In the embodiment shown in FIG. 1, the diagnostic cable 4 is connected to an evaluating electronic device, which is not illustrated in detail herein, by way of two assigned plugs 7, 8.

Figure 2:
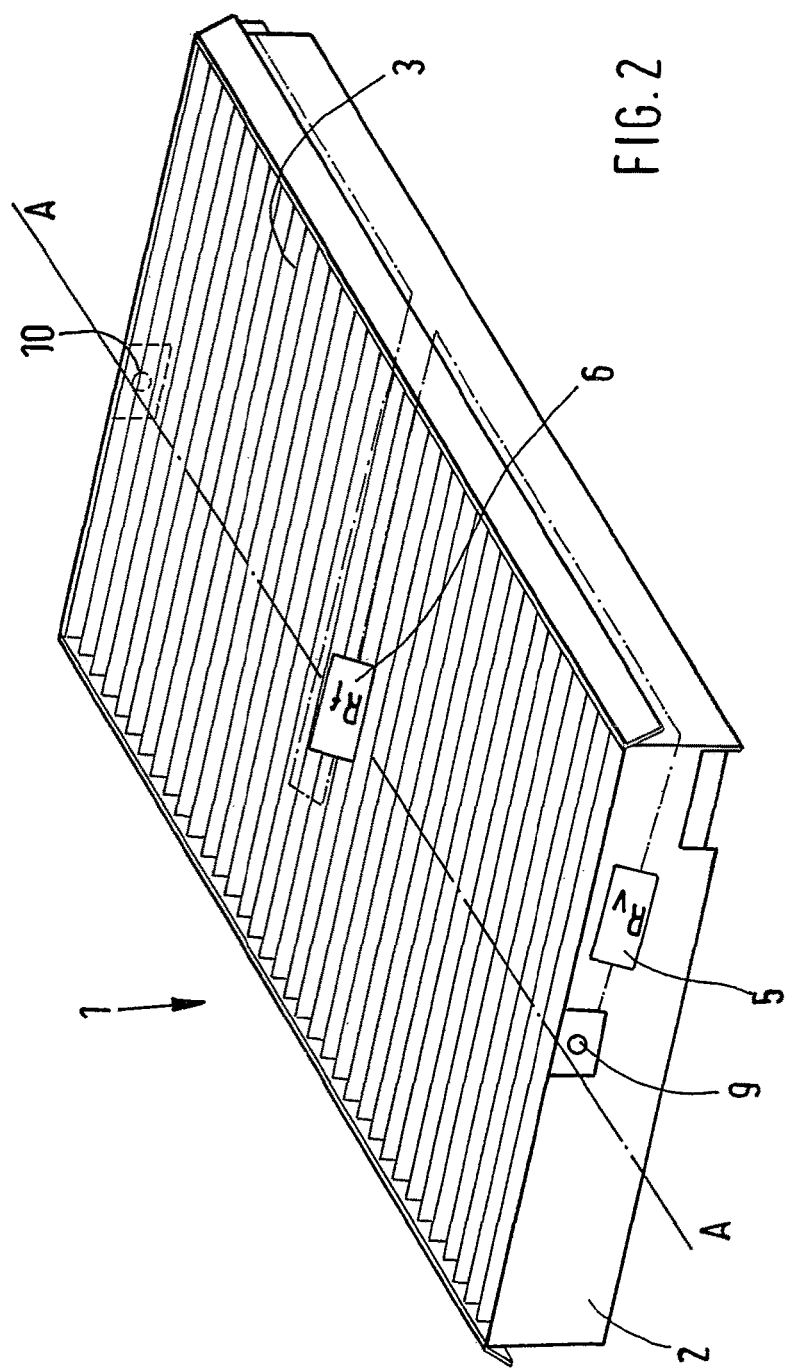
FIGS. 2 and 3 depict a second embodiment.
Figure 3:
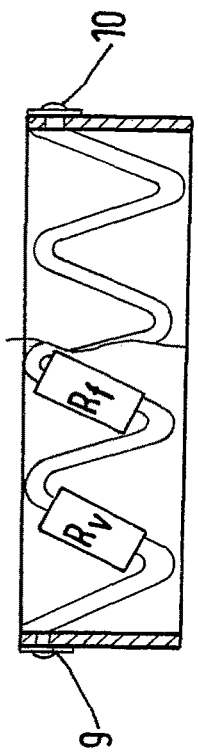

FIGS. 2 and 3 show a variant of the embodiment from FIG. 1. Instead of using plugs, the series connection, formed by the two resistors 5, 6, is connected electrically to the evaluating electronic device by way of contacts 9, 10, which are provided laterally on the frame 2 of the air filter 1. The "diagnostic cable" can be formed, for example, by use of a copper foil, which is mounted on the filter frame 2 or is integrated into the filter frame 2 and/or into the filter fabric 3.

Figure 4:
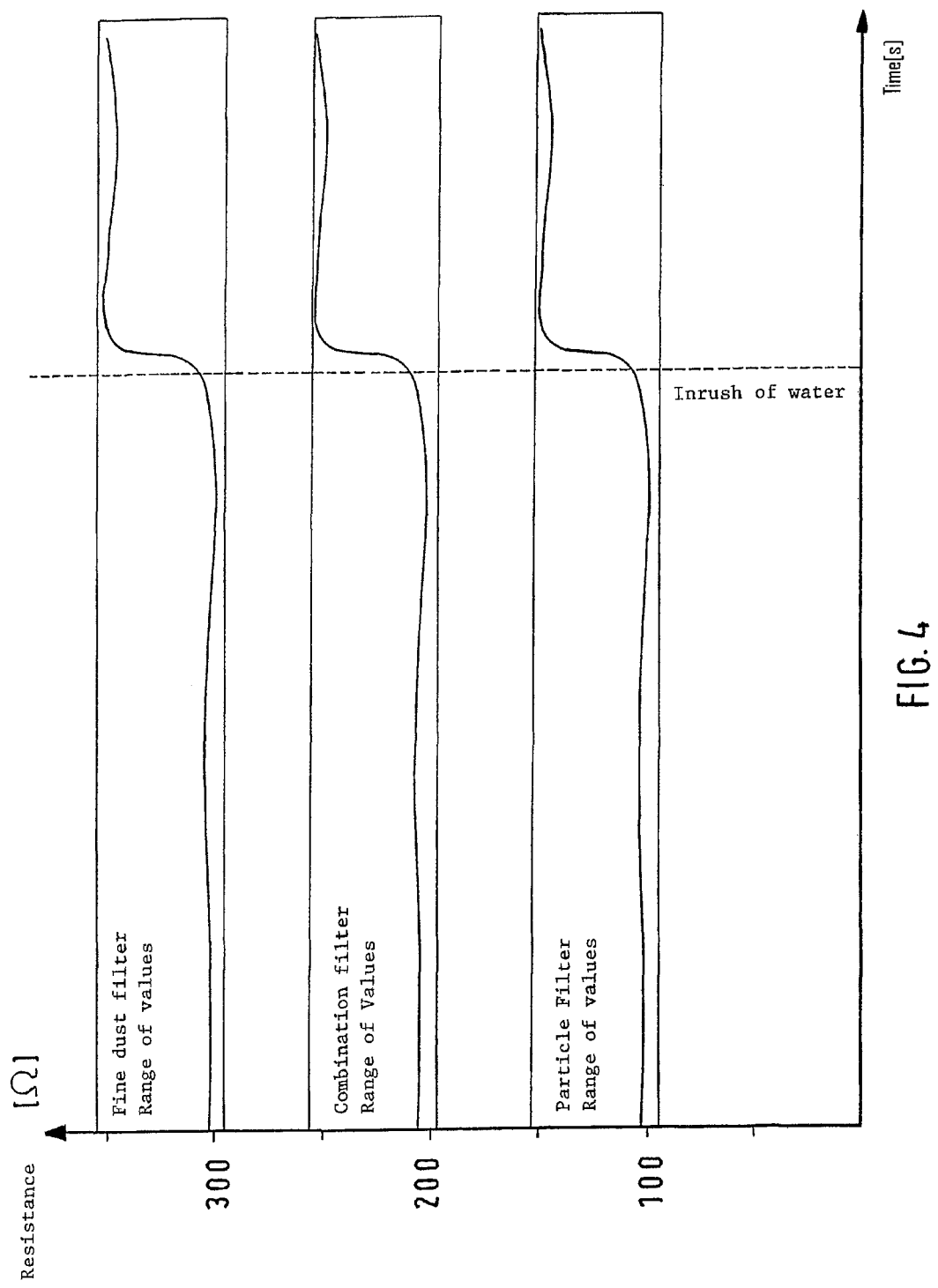
FIG. 4 illustrates the basic principle for detecting the incorporated filter type.

FIG. 4 describes how various types of filters can be coded by way of the resistance of the moisture sensor arrangement. For example, it can be provided that the electric resistance for a first filter type (for example, a particle filter) at very low moisture loading lies in a range of 100 ohms and at maximum moisture loading in a range of 150 ohms. If the evaluating electronic device detects a total sensor resistance in a range between 100 and 150 ohms, then the conclusion can be drawn that a particle filter was incorporated. Correspondingly, a combination filter and a fine dust filter can be coded, for example, by means of the value ranges of 200 ohms up to 250 ohms and/or 300 ohms and 350 ohms.

In addition, it can be provided that the evaluating electronic device measures not only the total resistance of the sensor arrangement that is present at a specific moment, but also the gradient of the sensor signal, that is, the time rate of change of the resistance. In the event of a steep gradient, it can be concluded that precisely at this moment there is "an inrush of water" or that the inrush of water has just ended.

Figure 5:
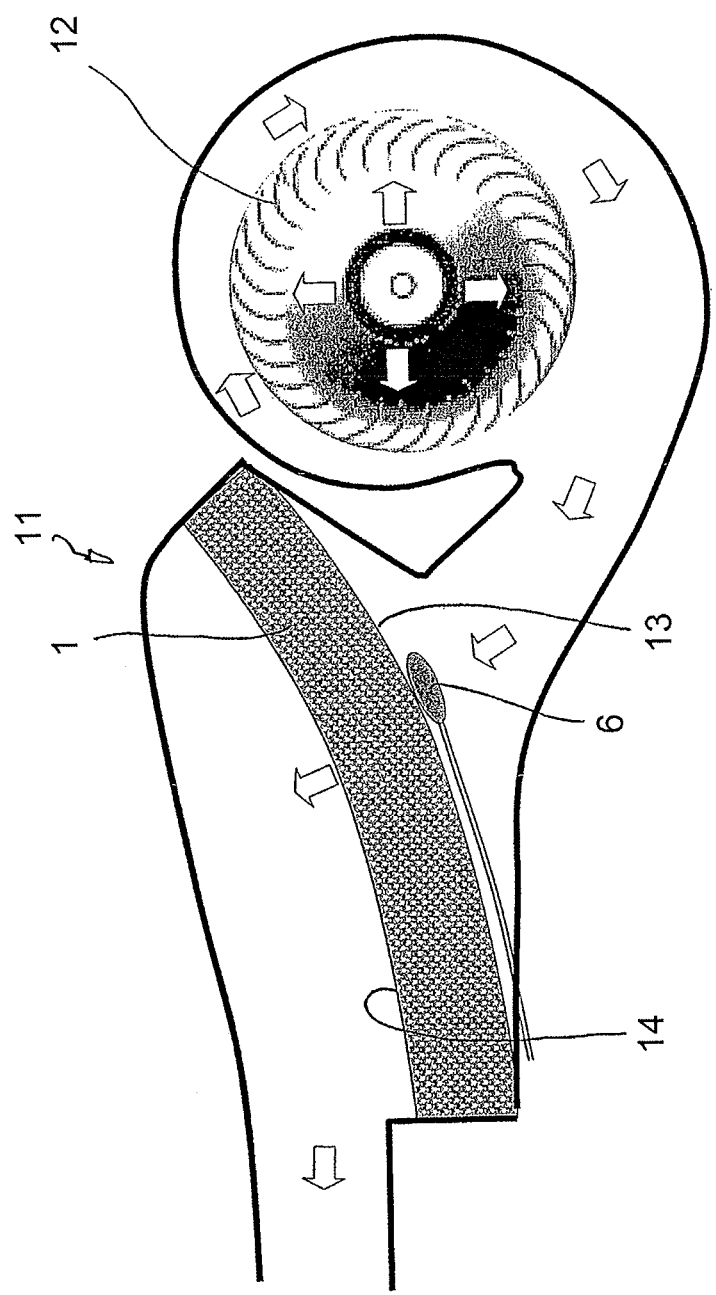
FIG. 5 is a schematic drawing illustrating the upstream arrangement of the moisture sensor.

FIG. 5 shows a cross section of the flow duct 11 of an air conditioning system of a vehicle. The flow duct arrangement has a blower 12, which draws in air, in particular atmospheric air, and blows and/or conveys it in the direction of the air filter 1, which is also disposed in the flow duct arrangement. The air filter 1 has an "upstream side" 13 and a "downstream side" 14. The moisture sensor 6 is disposed on the upstream side 13 of the air filter 1, that is, on the "pressure side" or on the side of the air filter 1 that faces the blower 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle air conditioning system for conditioning air delivered to a passenger compartment of a vehicle, comprising:
    an air filter;
    a liquid moisture sensor operatively mounted at least one of on and in close proximity to the air filter,
    an electronic device operatively configured to receive a signal from the moisture sensor, the electronic device at least one of controlling and regulating the air conditioning system of the vehicle; and
    wherein the moisture sensor is a capacitive sensor and is arranged upstream with respect to the air filter.

2. The vehicle air conditioning system according to claim 1, wherein the capacitive sensor has a dielectric, the dielectric being a ceramic element.

3. The vehicle air conditioning system according to claim 1, further comprising a heating unit operatively arranged to at least one of heat and dry the moisture sensor.

4. The vehicle air conditioning system according to claim 1, wherein the signal from the moisture sensor correlates with a moisture loading of the air filter.

5. The vehicle air conditioning system according to claim 4, wherein at least one functional parameter of the air conditioning system is controlled and/or regulated as a function of the signal from the moisture sensor.

6. The vehicle air conditioning system according to claim 1, wherein at least one functional parameter of the air conditioning system is controlled and/or regulated as a function of the signal from the moisture sensor.

7. The vehicle air conditioning system according to claim 6, wherein in at least one operating state of the air conditioning system of the vehicle, the electronic device controls and/or regulates a volumetric flow of intake fresh air for the air conditioning system as a function of the signal from the moisture sensor.

8. The vehicle air conditioning system according to claim 1, wherein in at least one operating state of the air conditioning system of the vehicle, the electronic device controls and/or regulates a volumetric flow of intake fresh air for the air conditioning system as a function of the signal from the moisture sensor.

9. The vehicle air conditioning system according to claim 1, wherein the capacitance sensor has an electric capacitance that changes with moisture loading of the air filter.

10. The vehicle air conditioning system according to claim 1, wherein the electronic device controls and/or regulates at least one functional parameter of the air conditioning system as a function of a time rate of change of the signal from the moisture sensor.

11. The vehicle air conditioning system according to claim 10, wherein the time rate of change of the signal from the moisture sensor is a gradient of the signal.

12. The vehicle air conditioning system according to claim 1, wherein the electronic device is coupled in a circuit in which the moisture sensor is arranged, the electronic device measuring an electric variable and comparing said measurement with stored values in the electronic device to determine a present type of the air filter.

13. A method for operating a vehicle air conditioning system for conditioning air delivered to a passenger compartment of a vehicle, the air conditioning system having an air filter, the method comprising the acts of:
    monitoring a time rate of change of a moisture signal from a liquid moisture sensor that is a capacitive sensor and is disposed on and/or at the air filter; and
    controlling and/or regulating at least one functional parameter of the air conditioning system of the vehicle as a function of the monitored time rate of change of the moisture signal.

14. The method according to claim 13, wherein the act of controlling and/or regulating further comprises the act of controlling and/or regulating a volumetric flow of intake fresh air for the air conditioning system of the vehicle as a function of the time rate of change of the moisture signal.

15. The method according to claim 13, further comprising the acts of:
    measuring an electric variable of a circuit in which the moisture sensor is arranged; and
    comparing the measured electric variable with a stored value to determine the type of air filter present in the vehicle air conditioning system.

* * * * *